United States Patent [19]
Dixon

[11] Patent Number: 5,090,852
[45] Date of Patent: Feb. 25, 1992

[54] HIGH STRENGTH FASTENER AND METHOD

[75] Inventor: Richard D. Dixon, San Juan Capistrano, Calif.

[73] Assignee: Huck Manufacturing Company, Irvine, Calif.

[21] Appl. No.: 739,726

[22] Filed: Jul. 30, 1991

Related U.S. Application Data

[63] Continuation of Ser. No. 185,327, Apr. 20, 1988, abandoned, which is a continuation of Ser. No. 45,186, Apr. 22, 1987, abandoned, which is a continuation of Ser. No. 664,209, Oct. 24, 1984, abandoned.

[51] Int. Cl.⁵ ............................................. F16B 19/00
[52] U.S. Cl. .................................................... 411/361
[58] Field of Search ................ 411/361, 360, 310, 311, 411/308, 411

[56] References Cited

U.S. PATENT DOCUMENTS

| | | | |
|---|---|---|---|
| 612,316 | 10/1898 | Downes . | |
| 1,229,560 | 6/1917 | Whiteman | 411/411 |
| 2,397,076 | 3/1946 | Keller et al. | 411/361 X |
| 2,510,076 | 6/1950 | Cockrell . | |
| 2,514,589 | 7/1950 | Penman | 411/423 |
| 2,531,048 | 11/1950 | Huck | 411/361 |
| 2,531,049 | 11/1950 | Huck | 411/361 |
| 2,669,469 | 2/1954 | Finch | 411/411 X |
| 2,764,046 | 9/1956 | Heinrich . | |
| 2,894,425 | 7/1959 | Rapata . | |
| 2,955,505 | 10/1960 | Schuster | 411/361 |
| 2,972,274 | 2/1961 | La Bombard et al. . | |
| 3,078,002 | 2/1963 | Rodgers, Jr. . | |
| 3,094,017 | 6/1963 | Champoux et al. | 411/361 X |
| 3,136,204 | 6/1964 | Reynolds . | |
| 3,139,786 | 7/1964 | Ardell . | |
| 3,203,300 | 8/1965 | Marschner . | |

(List continued on next page.)

FOREIGN PATENT DOCUMENTS

| | | |
|---|---|---|
| 157520 | 7/1954 | Australia . |
| 59825 | 9/1982 | European Pat. Off. . |
| 3022414 | 1/1972 | Fed. Rep. of Germany . |
| 2151847 | 4/1972 | Fed. Rep. of Germany . |
| 2613499 | 10/1977 | Fed. Rep. of Germany . |
| 2744666 | 4/1979 | Fed. Rep. of Germany . |
| 3031048 | 3/1982 | Fed. Rep. of Germany . |
| 3341266 | 5/1985 | Fed. Rep. of Germany . |
| 1546527 | 10/1968 | France .................. 411/411 |
| 2167419 | 7/1973 | France . |
| 22402 | 12/1961 | German Democratic Rep. . |
| 358991 | 1/1962 | Switzerland . |
| 483571 | 2/1970 | Switzerland . |
| 232671 | 1/1969 | U.S.S.R. . |
| 566907 | 1/1945 | United Kingdom ......... 411/411 |
| 1023780 | 3/1966 | United Kingdom . |
| 2028949 | 3/1980 | United Kingdom . |
| 2083586 | 3/1982 | United Kingdom . |

*Primary Examiner*—Rodney M. Lindsey
*Attorney, Agent, or Firm*—Harness, Dickey & Pierce

[57] ABSTRACT

A fastening system including a two piece swage top fastener including a pin and a collar in which the pin has shallow lock grooves having a ratio of $(h/D_u) \times 10^2$ of four (4) or less and in which the lock grooves have a simulated streamlined root contour generally defined by a portion of an ellipse, with the collar having a wall thickness defining a volume of material sufficient to provide overpacking of the shallow grooves of around 16% and to provide a clamp load of between around 85% to around 95% of the yield point of the pin, and with the pin and collar materials having ultimate shear strengths in a ratio of around 1.8:1 to 2.4:1 and with the width of the shallow pin grooves and intervening shoulders being generally in accordance with the shear strength ratio between the pin and collar.

33 Claims, 6 Drawing Sheets

U.S. PATENT DOCUMENTS

| | | | |
|---|---|---|---|
| 3,241,421 | 3/1966 | Siebol | 411/361 |
| 3,295,404 | 1/1967 | Baker | |
| 3,367,228 | 2/1968 | King | |
| 3,371,572 | 3/1968 | King | |
| 3,394,626 | 7/1968 | Oliver | 411/411 |
| 3,412,639 | 11/1968 | Sauter | |
| 3,421,562 | 1/1969 | Orloff et al. | |
| 3,425,259 | 2/1969 | Baugh | 411/361 X |
| 3,464,472 | 9/1969 | Reynolds | |
| 3,512,448 | 5/1970 | Summerlin et al. | |
| 3,560,124 | 2/1971 | Bergere | 411/361 |
| 3,779,127 | 12/1973 | Speakman | |
| 3,796,125 | 3/1974 | Campbell et al. | |
| 3,915,052 | 10/1975 | Ruhl | |
| 3,915,053 | 10/1975 | Ruhl | 411/361 |
| 3,988,959 | 11/1976 | Buchanan | |
| 3,999,339 | 12/1976 | Sappenfield | |
| 4,012,828 | 3/1977 | Dahl | |
| 4,028,988 | 6/1977 | Schafers | |
| 4,040,327 | 8/1977 | Otaki | 411/423 |
| 4,050,346 | 9/1977 | Fischer | |
| 4,069,575 | 1/1978 | Sigmund | |
| 4,084,829 | 4/1978 | Falchle et al. | 411/411 X |
| 4,136,596 | 1/1979 | Davis | 411/360 |
| 4,137,816 | 2/1979 | Gartner | |
| 4,197,782 | 4/1980 | Champoux | 411/361 |
| 4,198,895 | 4/1980 | Ruhl | |
| 4,254,809 | 3/1981 | Schuster | |
| 4,260,005 | 4/1981 | Stencel | |
| 4,309,138 | 1/1982 | Jarman et al. | |
| 4,314,784 | 2/1982 | Tausig | |
| 4,324,518 | 4/1982 | Dixon | |
| 4,339,217 | 7/1982 | Lacey | |
| 4,342,529 | 8/1982 | Smith | |
| 4,408,936 | 10/1983 | Williamson | |
| 4,435,111 | 3/1984 | Mizusawa | |
| 4,437,805 | 3/1984 | Smith | |
| 4,472,096 | 9/1984 | Ruhl et al. | |
| 4,519,735 | 5/1985 | Machtle | |
| 4,531,871 | 7/1985 | Sigmund | 411/361 |
| 4,867,625 | 9/1989 | Dixon | 411/361 |

HIGH STRENGTH FASTENER AND METHOD

This is a continuation of U.S. patent application Ser. No. 185,327, filed Apr. 20, 1988 which is a continuation of Ser. No. 45,186, filed Apr. 22, 1987, which is a continuation of Ser. No. 664,209, filed Oct. 24, 1984, all now abandoned.

SUMMARY-BACKGROUND OF THE INVENTION

The present invention relates to two-piece fasteners and more particularly to swage type fasteners having improved fatigue, tensile strength and retained clamp or preload characteristics.

The present invention generally relates to two-piece swage type fasteners or lockbolts of the type illustrated in U.S. Pat. No. 3,915,053 to J. Ruhl, issued Oct. 28, 1975, U.S. Pat. No. 2,531,048 to L. Huck, issued Nov. 21, 1950 and to U.S. Pat. No. 4,472,096 to J. Ruhl and R. Dixon, issued on Sept. 18, 1984. All of the above can be considered as prior art relative to the present invention.

In many commercial applications, two-piece threaded fasteners are used and are designated by a grade indicative of a particular strength level. For example, a ½-13 UNC Grade 8 bolt is a bolt for use in a nominal ½" diameter opening and has a 13 thread per inch coarse thread. The latter threaded fastener has a standard thread form which is designed to fail in a tensile mode across the diameter of the pin threads at a minimum preselected tensile load on the fastened joint. Similarly, a ½-20 UNF Grade 8 bolt will have a fine thread of 20 threads per inch of a standard configuration and will have somewhat different load and strength characteristics. Along the same line, a Grade 5 bolt will have lower strength characteristics than the Grade 8 and a Grade 9 will have higher strength characteristics. Often, a threaded fastener in order to provide as much clamp load as possible to the workpieces of the fastened joint will be torqued to the point where the bolt yields in tension. In many applications, however, where yielding is unacceptable the magnitude of the clamp load must be significantly reduced. In either case, however, because the pin is subjected to a combined stress, which includes the torsional stress from the applied torque and tensile stress from the resultant tension applied to the bolt, the magnitude of clamp load which can be realized is less than that if the fastener could be set without torque such as in a swage type system. In addition, of course, the torque type fasteners have the inherent problem of friction which also detracts from the amount of clamp load that can be realized from the applied torque.

In the present invention, however, a two-piece swage type fastener concept is provided which when constructed to provide a given design tensile load will have significantly improved fatigue and retained preload characteristics relative to its torque applied, threaded counterpart.

Thus, in the present invention, the fastener comprises a pin and a collar adapted to be swaged into lock grooves in the pin. The lock grooves in the pin, unlike prior lock grooves, are very shallow and are constructed to have roots of a simulated streamlined shape. The shallow grooves and simulated streamlined shape contribute to a resultant fatigue life which is vastly superior to that of the comparable threaded fastener. At the same time the collar is provided with a predetermined wall thickness, and hence volume, not only to provide an over fill condition of the lock grooves during swaging but also to provide a retained clamp having a magnitude which is a high percentage of the installation load and of the yield strength of the pin in tension across the lock grooves. Thus the collar wall thickness is selected to enhance retained clamp and to provide sufficient hoop stiffness to inhibit spring back of the collar material out of the shallow lock grooves in the pin. The subject fastener will also provide clamp loads which are significantly higher than those achievable with the threaded counterpart because of the absence of the applied torque (and resultant friction) required for the threaded system.

In the present invention the design failure load can provide a failure in shear across either the shoulders of the pin lock grooves or the shoulders defined by the swaged collar. In other words, a relatively high strength pin is used which will not fail across the engaged grooves at the lower magnitudes of applied tensile loads. Thus, with a given pin, the magnitude of available design tensile load can be increased or decreased simply by varying the length of the collar and hence by varying the number of pin and collar shoulders that are supporting the tensile load. This selective variation can occur until the appropriate number of engaged shoulders are provided whereby failure under tensile loading will occur as a tensile failure across the diameter of the pin.

In one form of the present invention the resultant preload applied to the pin is slightly below that load at which yielding would occur in the pin lock grooves. The collar is slightly longer than that required to provide engagement of the appropriate number of pin and collar shoulders to hold that preload; in this case the failure at the design tensile load will be in shear across the collar and/or pin shoulders. By simply increasing the length of the collar the number of engaged shoulders will be increased whereby failure will occur at a higher tensile load in tension diametrically across the pin lock grooves. In either event, the result will be a retained preload of a high magnitude on the fastened joint. In fact this retained preload for a system of ferrous materials will be at around 85% to around 95% of the yield strength of the pin in tension across the lock grooves. A similar percentage of retained clamp load of the latter magnitude is not readily attainable by the noted threaded systems without undesirably high installation and residual stresses because of the torsional stress applied in torquing the fastener as well as other factors.

Note that when the high preload levels are considered in conjunction with the advantages of lock grooves which are considerably shallower than the threads or grooves in the comparable threaded system, the attainable improvement in fatigue and retained stress is even more significant. As will be seen, some additional gains can be secured by providing the lock grooves to be helical in shape rather than annular. Here the tensile strength and fatigue life of the pin will be somewhat greater since the helical shape will provide a greater diametrical lock groove dimension; this results in a greater effective cross-sectional area than that provided across the minimum root diameter where an annular construction is used.

Thus the fastener of the present invention will not only provide significantly improved fatigue characteristics but will also provide a very high clamp load, i.e. at around 85% to around 95% of the yield strength of the pin. In one form of the invention the fastener can provide a tensile load carrying capacity up to the tensile strength of the pin across the lock grooves which, because of the shallow grooved structure, will be of a maximized magnitude relative to the pin diameter.

Thus it is an object to provide a novel two-piece swage type fastener with a pin having relatively shallow lock grooves of a simulated streamlined root configuration whereby fatigue life of the installed fastener is improved.

It is another object of the present invention to provide the pin with shallow grooves of the above described type whereby the clamp load of the fastened joint can be maximized relative to the installation load and the tensile yield strength of the pin.

It is still another object of the present invention to provide a novel two-piece swage type fastener having a collar of a preselected wall thickness for providing a magnitude of retained clamp load which is a high percentage of the installation load applied to the fastened joint.

It is another general object of the present invention to provide a novel two-piece swage type fastener.

Other objects, features and advantages of the present invention will become apparent from the subsequent description and the appended claims, taken in conjunction with the accompanying drawings, in which:

Figure 9:
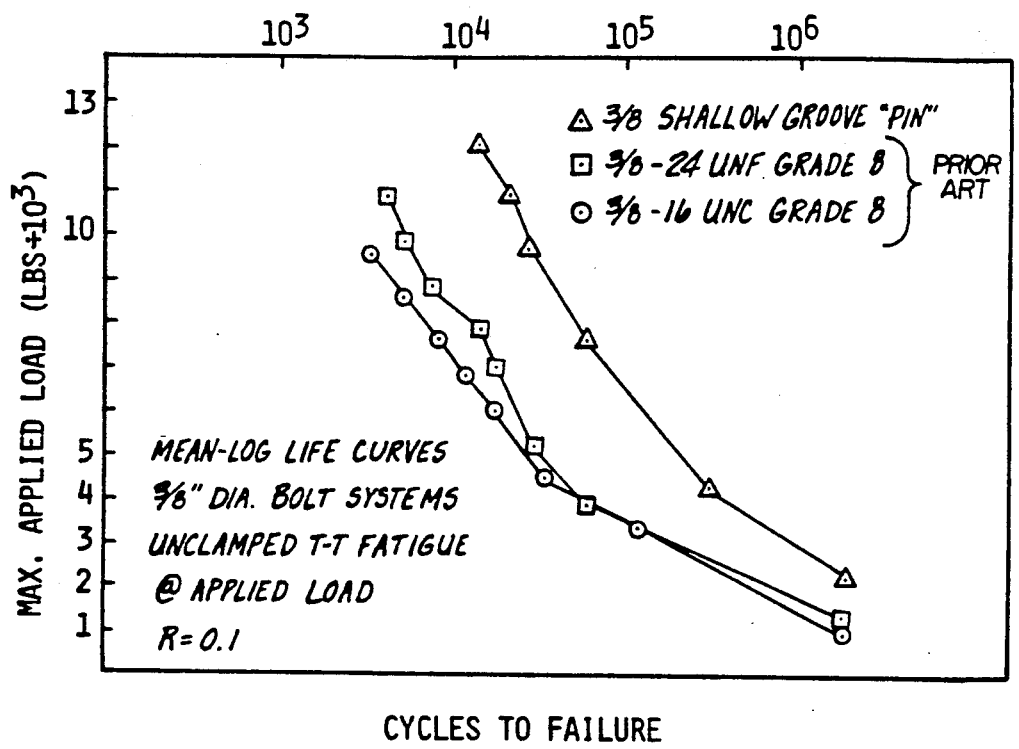
Figure 8:
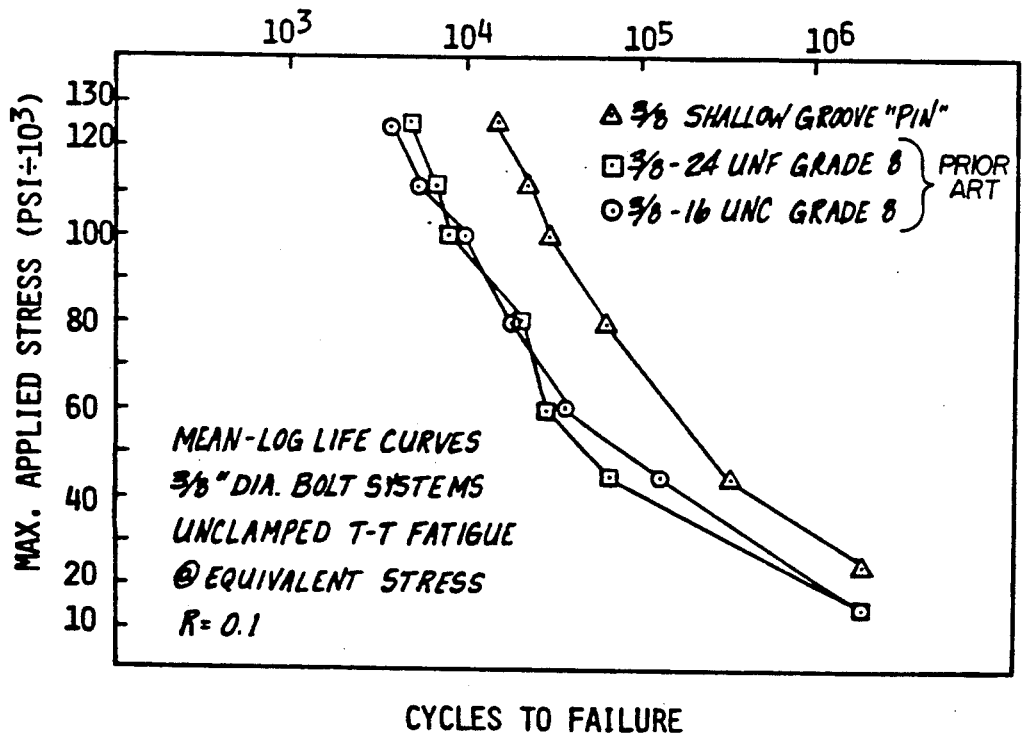

FIG. 8 is a graphical representation comparing the fatigue life under tension-tension loading of conventional Grade 8 threaded bolts and of comparable Grade 8 pins having lock grooves of the present invention where the data is plotted to show the relationship of maximum applied stress versus stress cycles; and FIG. 9 is a graphical representation of the same data of FIG. 8 but plotted to represent the fatigue life as a function of the applied load under tension-tension loading versus load cycles for conventional Grade 8 threaded bolts and comparable Grade 8 pins having lock grooves of the present invention.

Figure 1:
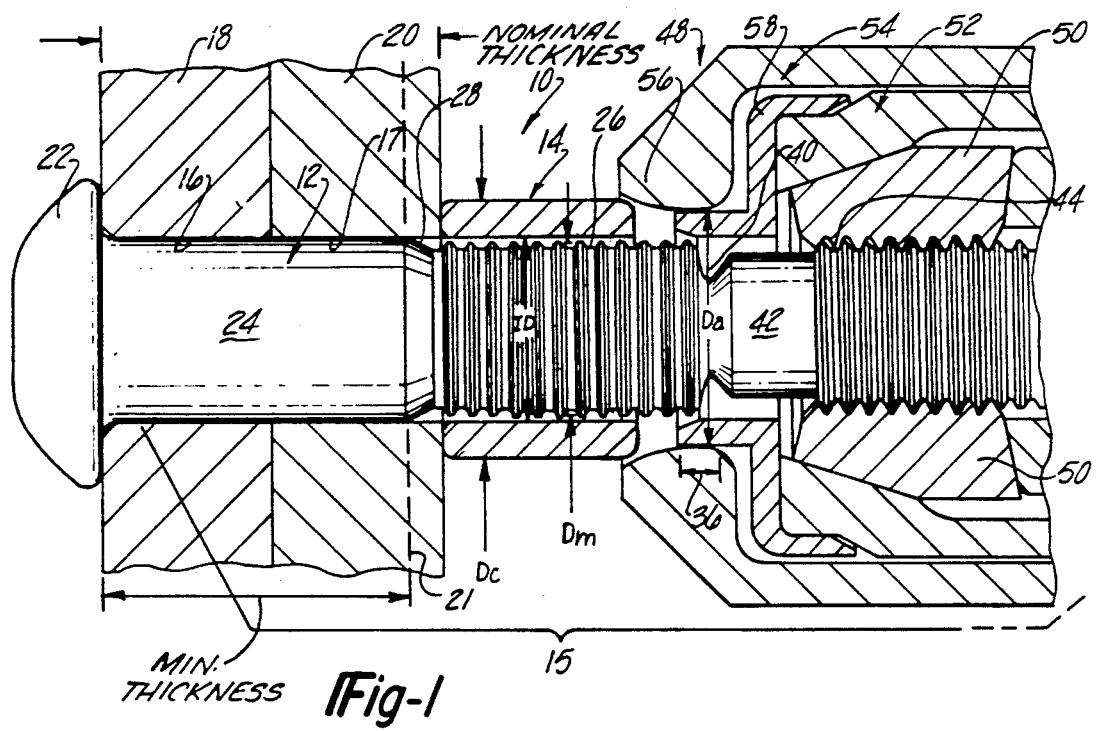
FIG. 1 is a longitudinal view with some portions shown in section and others shown broken away of a fastener of the present invention in assembly relationship with workpieces of a generally nominal total thickness and with a portion of a tool shown as applied to the fastener prior to installation.
Figure 2:
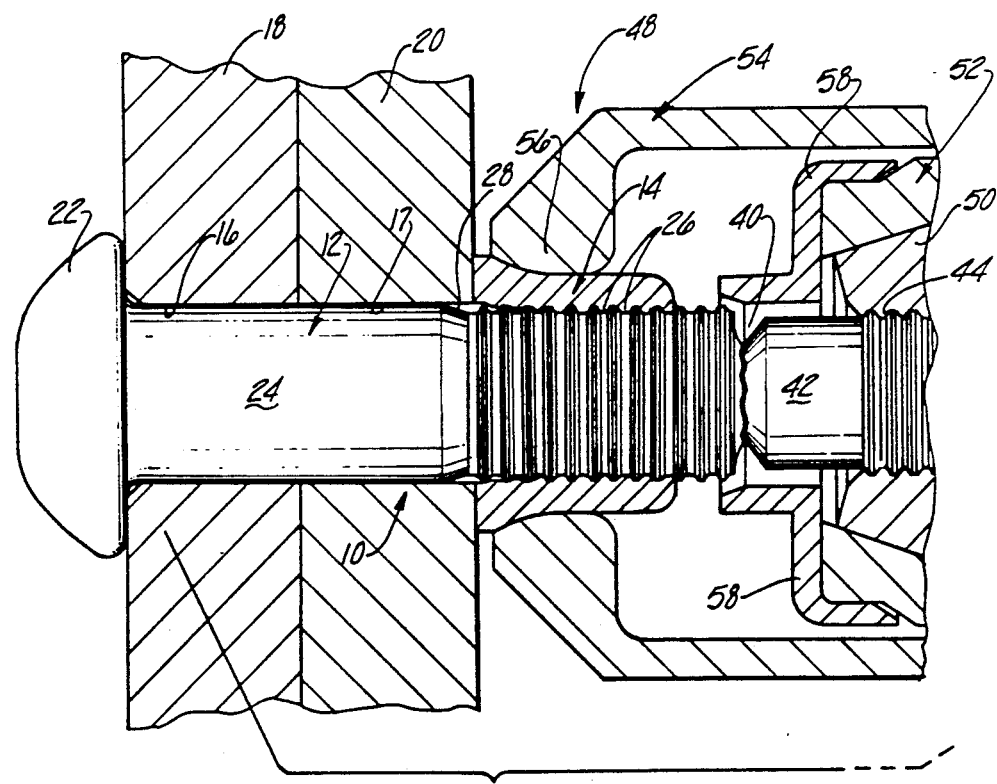
FIG. 2 is a view similar to that of FIG. 1 showing the fastener after it has been set.

Looking now to FIGS. 1 and 2, a fastener 10 is shown to include a pin member 12 and tubular collar 14. Pin member 12 has an elongated shank 15 which extends through aligned openings 16 and 17 in a pair of workpieces 18 and 20, respectively, to be secured together. An enlarged protruding head 22 at one end of shank 15 engages one side of workpiece 18. Adjacent the head 22, the shank 15 has a straight portion 24 which is adapted to be received within aligned bores 16 and 17 with a slight clearance. Following the straight portion 24 is a plurality of circumferentially extending, annular locking grooves 26. A transition portion 28 smoothly connects the locking grooves 26 with straight shank portion 24.

A breakneck groove 40 is located adjacent the locking grooves 26 and defines the weakest portion on the shank 15. A straight land 42 is located between the breakneck groove 40 and a plurality of pull grooves 44. Relative to the shank portion 24 and locking grooves 26, the land 42 is of a reduced diameter, as are the pull grooves 44. The pull grooves 44 are adapted to be gripped by a tool 48 which is actuable to set the fastener 10. The tool 48 can be generally constructed in a manner known to those skilled in the art and hence is only partially shown for purposes of simplicity. Briefly, the tool 48 has a plurality of jaws 50 adapted to grip the pin 12 at pull grooves 44. Jaws 50 are located in a tubular collet assembly 52 which is slidably supported in an anvil housing 54 which terminates at one end in a swage anvil portion 56.

The symmetrically shaped, tubular collar 14 is adapted to be located over the shank 15 and, with the workpieces 18, 20 pulled together, will be in radial alignment with some of the locking grooves 26. Note that workpieces 18 and 20 have a combined thickness defining a nominal grip of the fastener 10. The fastener 10, however can be employed over a predetermined grip range which ranges from workpieces having a minimum total thickness to a maximum total thickness. The minimum total thickness for the fastener 10 is shown in FIG. 1 by line 21; here the collar 14 will be aligned with and swaged into those of the lockgrooves 26 located nearest the straight shank portion 24. With actuation of the tool 48, a relative axial force is exerted between the pin 12 and collar 14 resulting in swaging of collar 14 into the locking grooves 26 of pin 12. Upon completion of the swaging, the shank 15 will be severed at the breakneck groove 40, as shown in FIG. 2. Subsequently, upon further actuation of the tool 48, a collar ejector member 58 will be urged forwardly to eject the swaged collar 14 from the anvil 56 thus completing the installation.

Figure 3:
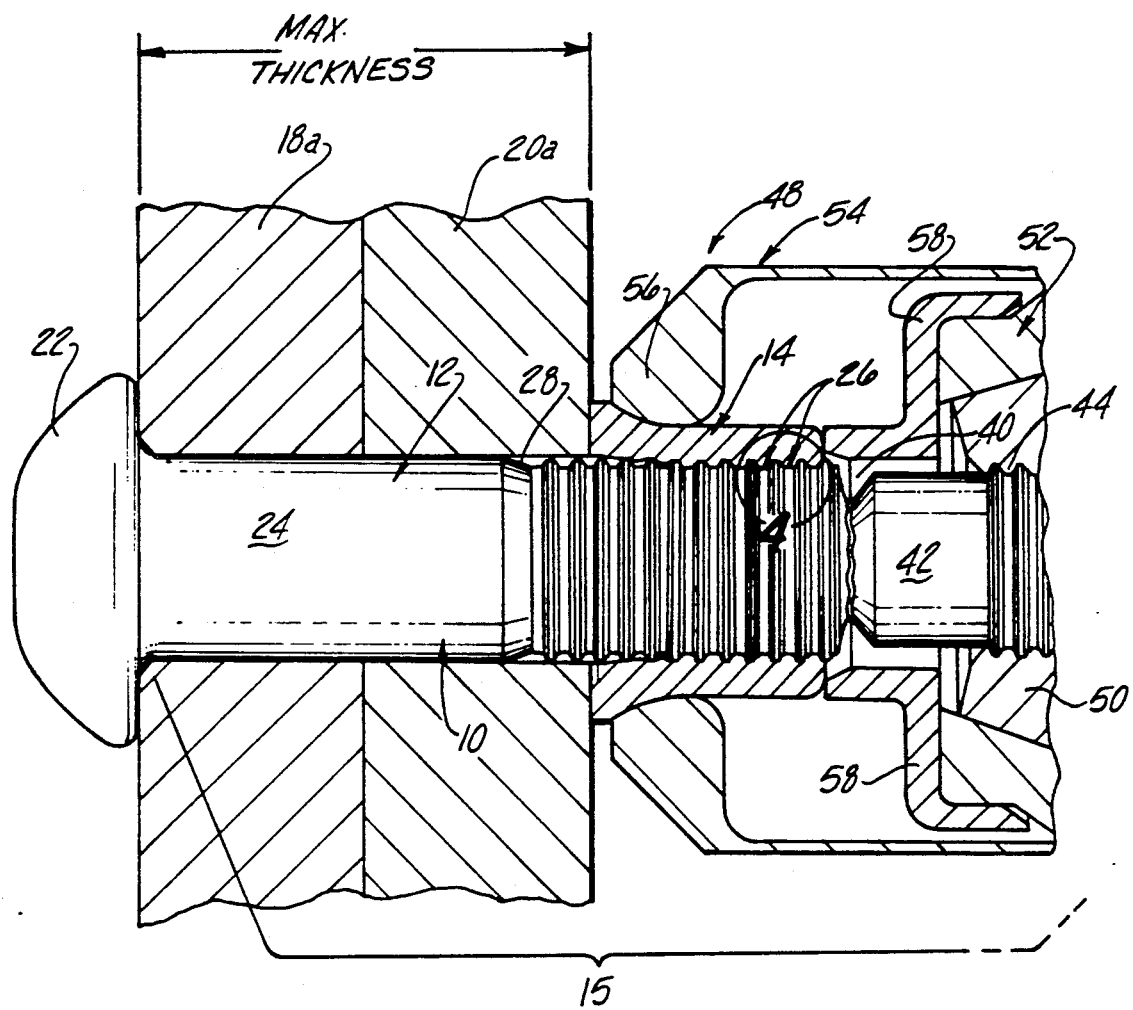
FIG. 3 is a view similar to that of FIG. 2 showing the fastener securing workpieces of a maximum total thickness and with the swage anvil of the tool shown in the engaged, installed condition.

FIG. 3 depicts the fastener 10 installed in the maximum grip condition with workpieces 18a and 20a defining the maximum total workpiece thickness for fastener 10. Note, in this maximum grip condition, the collar 14 is swaged in the grooves of lockgrooves 26 most proximate to the breakneck groove 40.

Figure 4:
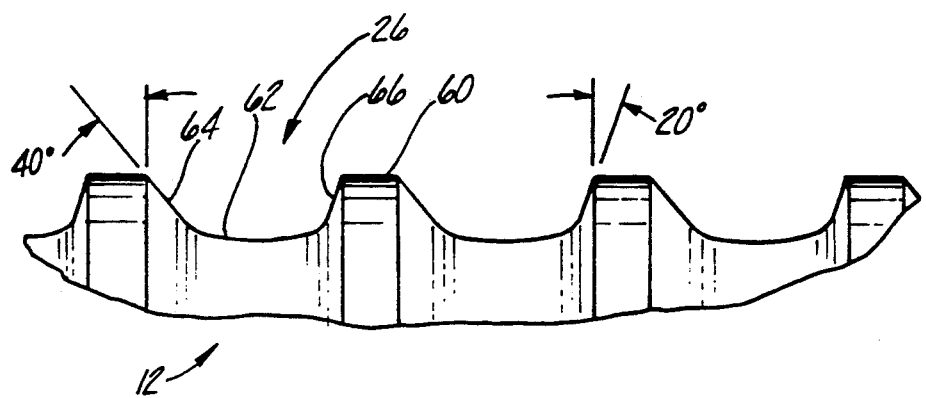
FIG. 4 is an enlarged fragmentary view taken in the circled area 4 in FIG. 3 of the lock grooves of the pin.
Figure 5:
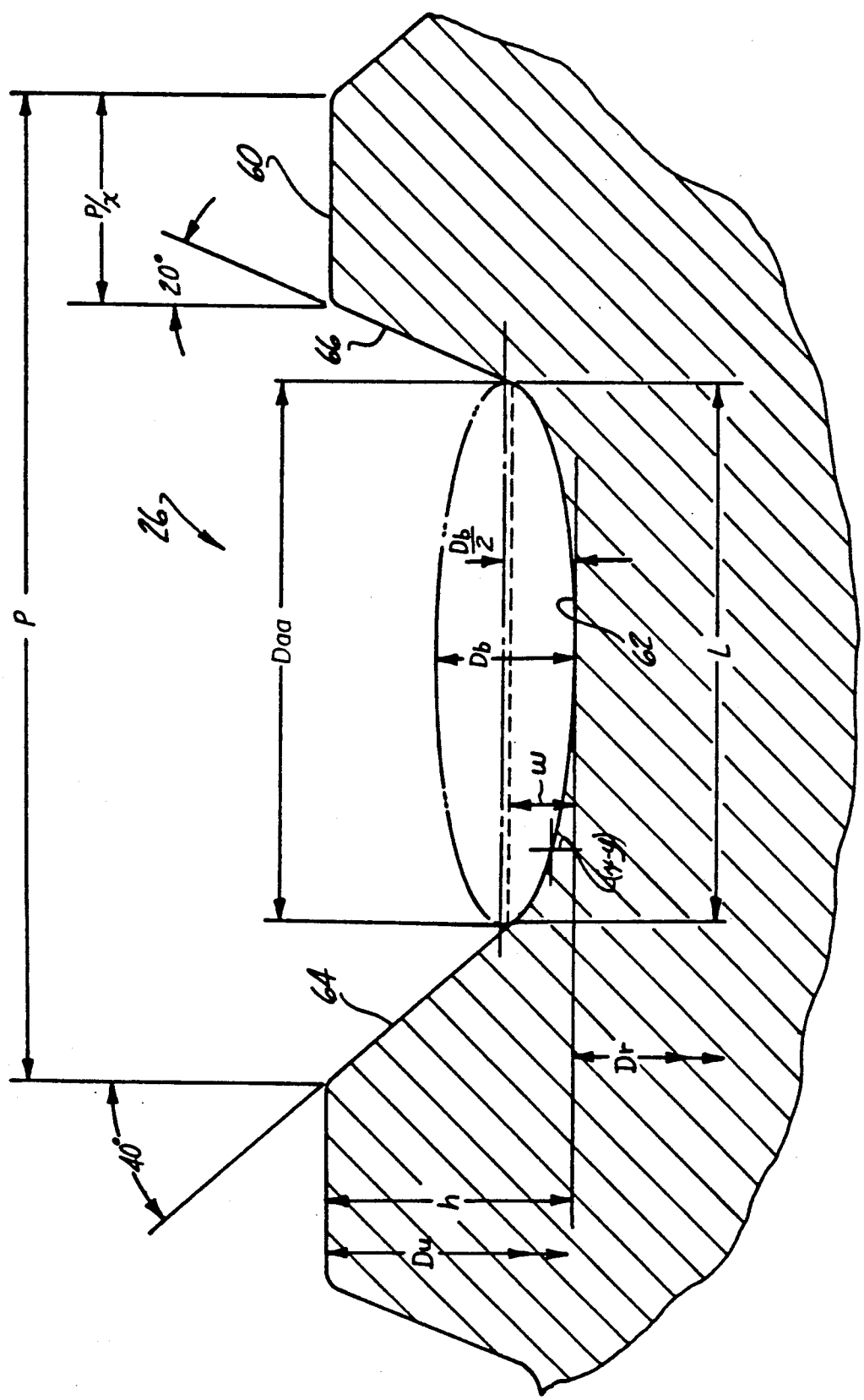
FIG. 5 is an enlarged fragmentary view of one of the lock grooves of FIG. 4.

As best can be seen in FIGS. 4 and 5, the lockgrooves 26 are of a shallow construction and have a closely approximated streamlined root configuration. A streamlined contour provides a transition between two different diameters with essentially no stress concentration or an effective stress concentration factor (Kt) of one (1). The lockgrooves 26, which are separated by annular shoulders 60 can be considered to be defined by a root portion 62, which is connected at one end to a leading transition portion 64 and at the opposite end to a trailing transition portion 66. In order to approximate a streamlined shape as closely as possible, the root portion 62 is generally elliptically shaped and can be generally defined by the relationship:

$$\frac{x^2}{Daa^2} + \frac{y^2}{Db^2} = 1,$$

where (x, y) are the coordinates for a point on the root curvature surface. Actually, the elliptical shape simulates two streamlined contours, one from transition portion 64 and the other from transition portion 66.

In addition to the above the lock grooves 26 are further defined by the following:
1. P is the pitch between successive lock grooves 26;
2. P/X is the width of the shoulders 60 where X is selected to provide proportioned strength between the ultimate shear strengths of the material of collar 14 and the material of pin 12 such that, under tensile load, a failure in shear could occur at the effective shear plane across either the pin shoulders 60 or the resultant shoulders in the swaged collar;
3. h is the depth of lockgrooves 26 (or thread depth for a threaded pin);
4. Dr is the effective root diameter of lock grooves 26 (or the thread for a threaded pin) across which the tensile load is applied;
5. Du is the crest diameter of pin shoulders 60 (or the diameter defined by the crests of a threaded pin);
6. Daa is the major axis of the ellipse defining the elliptical root contour of root portion 62;
7. Db is the minor axis of the ellipse defining the elliptical root contour of root portion 62;
8. Db/2 is one half of the minor axis or the distance along the minor axis Db from root portion 62 up to the major axis Da;
9. L is the axial distance between the respective tangential intercepts of the leading transition portion 64 and the trailing transition portion 66 with the ellipse portion defining root portion 62; and
10. W is the radial distance along the minor axis Db from root portion 62 to the axial line defined by the axial length L.

In one form of the invention, the leading transition portion 64 was provided to be at a 40° angle with a plane transverse to the axis of pin 12 while the trailing transition portion 66 was provided to be at a steeper angle of 20°. The angle of the leading portion 64 facilitates flow of the material of collar 14 in swage while the steeper angled trailing portion 66 provides a buttressing effect to contain the swaged collar material. This buttressing effect facilitates clamping of the workpieces 18a and 20a as the collar 14 elongates during swage. The transition portions 64 and 66 tangentially intercept the elliptical root portion 62 whereby a smooth transition in contour is provided. The elliptically shaped root portion 62 has an axial length L which is less than the major diameter Daa and a radial width W which is less than the minor axis dimension Db/2. The root portion 62 will always have a length L and width W no greater than the major and minor axes Daa and Db, respectively. However, in order to assure a smooth transition with the essentially straight transition portions 64 and 66, generally at the angles of inclination noted, it is desirable that the width W be no less than around 80% of the minor axis dimension Db/2 or 40% of Db.

With the fastener construction of FIGS. 1–3, it has been found that the depth of each of the grooves can be selected to provide a desired minimum ratio of depth h to the crest diameter Du of the pin 12. In this regard, the major criteria of groove depth h is that it be sufficiently deep as a practical matter to receive and retain the material of the collar 14 after swage. A groove depth h of around 0.04×Du or less is desirable. With such a shallow groove, the root diameter Dr will be maximized for a pin with a given crest diameter Du. This will provide that a pin 12 of a given material will have nearly the maximum tensile strength available since tensile failure would occur across the root diameter Dr which, when maximized, is only slightly less than the crest diameter Du. The maximized root diameter Dr will also provide improved fatigue life. Thus, for a pin of a given diameter, the present invention will result in an increase in tensile strength and fatigue life over its threaded counterpart. At the same time, the groove 26 being shallow will permit the use of the simulated streamlined or elliptical shape at root portion 62 resulting in a significantly reduced stress concentration factor Kt. Again, the result will be an increase in fatigue life over a comparable conventional threaded fastener.

Figure 7:
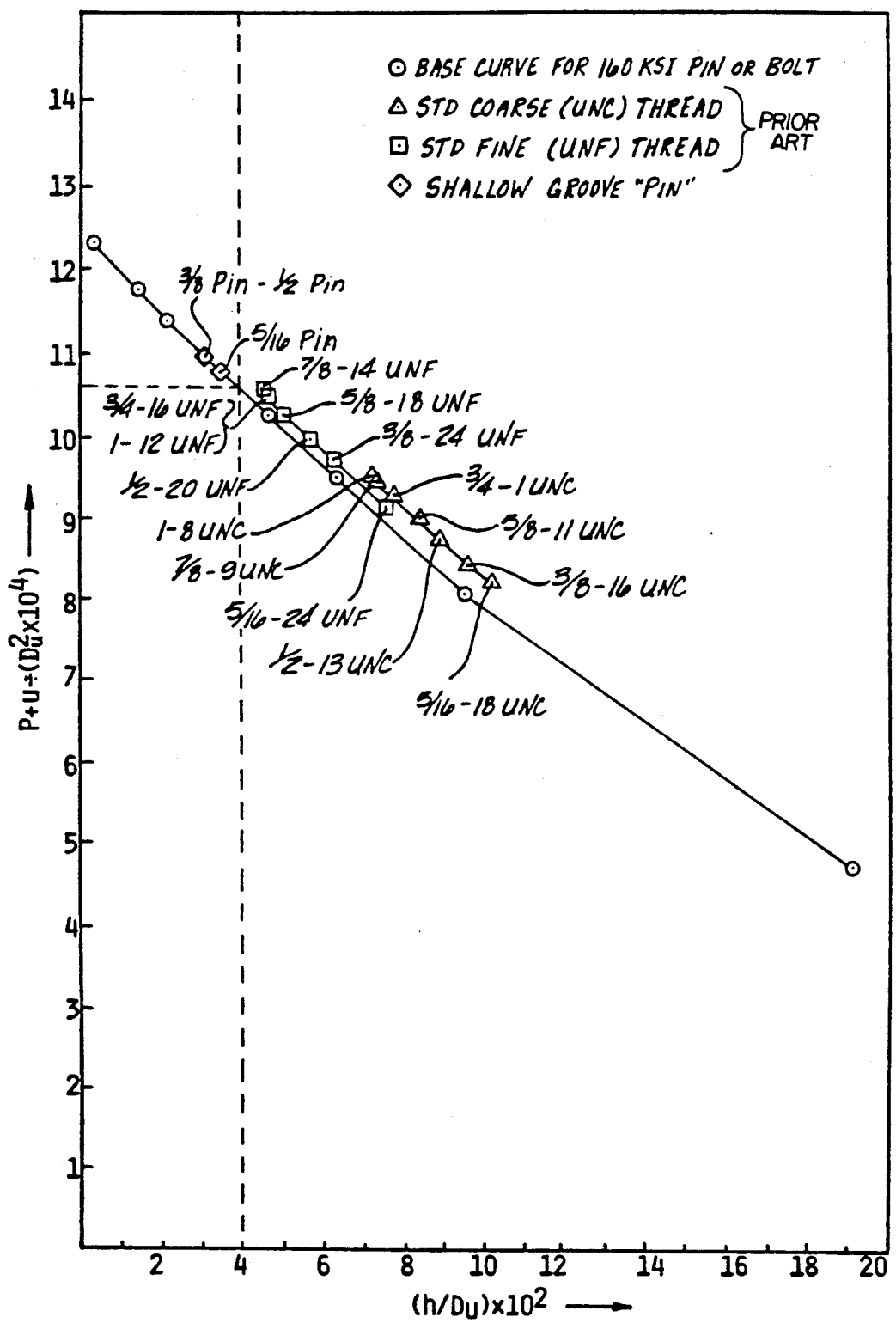
FIG. 7 is a graphical representation of the relationship of $(h/Du) \times 10^2$ versus $Ptu/(Du^2 \times 10^4)$ calculated for conventional Grade 8 threaded bolts and for comparable Grade 8 pins having lock grooves in accordance with the teachings of the present invention where the designations of h, Du, and Ptu are as defined in the specification.

The improvement in tensile strength can best be seen from the graph of FIG. 7. Thus, FIG. 7 is a graphical representation depicting the superiority in the tensile characteristic of pin 12 having the shallow lock grooves 26 compared to threaded fasteners. Thus, in FIG. 7 the 'Y' axis is the relationship:

$$Ptu/(Du^2 \times 10^4),$$

where:
Ptu is the ultimate tensile strength in load (lbs.) of the pin across the lock grooves 26 or, if a threaded pin, across the threaded portion;
The 'X' axis is the relationship:

$$(h/Du) \times 10^2.$$

In the graph of FIG. 7, the tensile strengths of Grade 8 threaded bolts and of the comparable Grade 8 pin 12 were assumed to be the same, i.e., 160 KSI. The comparable Grade 8 pin 12 was provided to have an overall envelope similar to the conventional Grade 8 bolts whereby either type would be interchangeable in the same workpiece openings with generally the same fit. It can be seen from FIG. 7 that the shallow grooved pin 12 is substantially superior in tension than its threaded counterparts. The results of FIG. 7 were derived by calculation knowing the physical geometry of the pins and threaded bolts being compared. Thus the pins with shallow lock grooves 26 had crest diameters Du of 5/16", ⅜" and ½"; these pins had a groove depth h which defined the expanded ratios of h/Du of between around 3.2 and 3.5 and corresponding expanded Ptu ratios of between around 10.8 to around 11. In FIG. 7 the Basic Curve for a pin or bolt having a 160 KSI tensile strength is plotted as a guide, with data points being randomly selected.

The graph of FIG. 7 plots the results for Unified National Coarse (UNC) threads with Grade 8 bolts having crest diameters Du and threads per inch of 5/16-18, ⅜-16, ½-13, ⅝-11, ¾-10, ⅞-9 and 1-8. The graph also plots the results for Unified National Fine (UNF) threads with Grade 8 bolts having crest diameters Du and threads per inch of ⅜-24, ½-20, ⅝-18, ¾-16, ⅞-14 and 1-12. These bolts had a thread depth h which defined the expanded ratios of h/Du of between 7.3 to around 10.2 for the coarse (UNC) threaded bolts and between 4.8 to 10.2 for the fine (UNF) threaded bolts. The results, however, should be analyzed on a comparison of comparably sized pins and bolts such as pin 12 and threaded bolts of the same diameter. Thus the pin 12 with a crest diameter Du of ⅜" had a tensile strength characteristic (Ptu/(Du² × 10⁴)) of 11 while the ⅜" UNF counterpart was 9.7 and the UNC counterpart was only 8.5. Similarly the pin 12 with a crest diameter Du of ⅜" had a tensile strength characteristic of 11 while the ⅜" UNF counterpart was 10 and the UNC counterpart was only 8.8. Likewise the pin 12 with a crest diameter Du of 5/16" had a tensile strength characteristic of 10.9 while the 5/16" UNF counterpart was 9.2 and the UNC counterpart was only 8.2. Thus, the swage type pin 12 with shallow grooves 26 having a ratio of $((h/Du) \times 10^2)$ of around four (4) or less provides a significant improvement in tensile strength characteristic (i.e., an expanded Ptu ratio of over 10.6) over comparable threaded fasteners. But the improvements in fatigue life are at least as significant.

A comparison of the fatigue characteristic of the shallow grooves 26 of pin 12 with comparable threaded bolts can be seen in the graphs of FIGS. 8 and 9. FIG. 8 shows a comparison of fatigue life between Grade 8 type fasteners having a crest diameter Du of ⅜", namely a comparable Grade 8 pin 12 with the shallow grooves 26 and the standard Grade 8 bolts being ⅜-24 UNF and ⅜-16 UNC. The test conducted was a tension-tension fatigue test. The data points represent the average of three test specimens for each point. The samples of both pins and bolts had a hardness of 35 Rc in the Grade 8 range which is around 33 Rc to around 39 Rc. The tests were conducted "unclamped", meaning that the pins and bolts were under no clamp load or preload; the applied load was cycled from between the selected maximum load or stress to 10% of the selected load or stress; the latter is indicated by the designation R=0.1 on the graphs. Thus the curves eliminate the factor of increased tensile strength in the grooves 26 of pin 12 because of their root diameter Dr which is larger than that of the comparable threaded fastener. Hence this data, essentially, compares the different groove structures. Thus the data was plotted in two different ways in FIGS. 8 and 9. In FIG. 8 the applied load was selected to provide an equivalent stress in the grooves 26 of pin 12 and in the threads of the UNF and UNC Grade 8 bolts. The data of FIG. 8 shows that with equal stresses applied to each of the test specimens, the shallow lock grooves 26 of pin 12 exhibited a significantly longer fatigue life resulting from the simulated streamlined, elliptical root shape and from the lower stress concentration factor.

FIG. 9 is a comparison of fatigue life under the actual tensile loads applied. This data reflects the effects of increased tensile strength resulting from a larger root diameter Dr because of the shallow groove 26. Again, the shallow grooved construction of pin 12 shows significantly improved fatigue life.

The fatigue tests on the pins such as pin 12 resulted in failure at the center of one of the shallow lock grooves 26, i.e. generally along the minor axis Db, indicating the effectiveness of the simulated streamlined contour in reducing the stress concentration factor Kt and providing good stress distribution in the grooves 26.

With a shallow groove construction, it is desirable to provide the collar 14 with a volume such that when swaged into the locking grooves 26 it will have an excess volume over that required to fill the grooves 26.

In one embodiment, the volume of collar 14 was selected to provide 'overpacking', i.e., a volume of collar 14 to provide substantially more volume of collar material for filling grooves 26 than they could normally accept within the swage envelope defined by the throat 36 of the swage cavity of anvil 56 and the confronting portion of pin 12 (see FIG. 1). In the present system for the Grade 8 type fastener, it has been found desirable to provide a volume of collar material which has an excess of at least around 16%. With the shallow grooves 26, excess collar volume over the noted 16% is not required since the amount of radial inward movement of collar material is not as great as with prior lock grooves of a deeper construction. The percentage 'overfill' or 'overpacking' noted can be generally determined for a finite length of the effective swage portion of throat 36 (see FIG. 1) by the relationship:

$$100 \times \frac{[(Dc^2 - ID^2) - (Da^2 - Dm^2)] \, dl}{[Da^2 - Dm^2] \, dl} = \% \text{ overfill}$$

where:
Da is the diameter of the throat 36 of anvil 56;
Dc is the outside diameter of the collar 14 before swage;
ID is the inside diameter of the collar 14 before swage;
Dm is the mean diameter of the lockgrooves 26; and
dl is considered to be a finite length within the swage portion of throat 36.

Because of the shallowness of the lock grooves 26, it is desirable that the pin 12 be hard enough relative to the hardness of the collar 14 to resist crushing or substantial yielding in tension or necking down from the high compressive swage loads. Thus, in one form of the invention, for the Grade 8 type fastener, the pin 12 could be made of AISI 4140 alloy steel or AISI 1541 carbon steel having an ultimate shear strength of at least around 95 KSI. The collar 14 could be made of AISI 1035 carbon steel having an ultimate shear strength of at least around 45 KSI. Generally it is desirable to utilize a pin 12 having an ultimate shear strength relative to that of collar 14 in the ratio in a range of around 1.8:1 to around 2.4:1. Thus the pin 12 has a sufficient hardness to accept both the high tensile preloads desired and the swage loads on the collar substantially without yielding. It also should be noted that, from a manufacturing standpoint, the shallow grooves 26 are more easily formed than the prior, deeper lock grooves and, in fact, can be formed after the pin has been hardened.

However, in order to realize the high clamp load, the collar 14 must have a sufficient wall thickness and, hence, volume to insure that enough collar material will move axially in elongation. At the same time it is desirable that the swaged collar have sufficient wall thickness and, hence, have suffcient strength to resist any significant spring back from the shallow lock grooves 26. The collar wall also should have sufficient thickness to resist significant radial expansion under tensile load such that the pin shoulders 60 and collar shoulders remain in substantially full engagement as the design tensile load on the joint is reached. If the wall does not provide sufficient radial stiffness, the collar 14 could expand radially under tensile load, reducing the effective shear plane carrying the load. The result could be a premature failure in shear at the tips of the pin shoulders 60 or collar shoulders. The desired shear failures, previously referred to, are at the effective shear plane defined by full engagement and will occur at higher tensile loads. In this regard, the required wall thickness of the collar 14 will increase as a function of its diameter Dc. Thus the final swaged wall thickness must be sufficient to withstand at least the minimum design tensile load such that failure will occur in shear generally across the maximum effective shear plane between the pin or collar shoulders or in tension across the lock grooves. Of course, the collar wall if too thick will impede swaging and require excessive installation loads.

Thus, the collar wall thickness is selected to provide the necessary material to promote swaging into the shallow lock grooves 26 and flow in elongation to provide the desired clamp load. At the same time, the collar wall thickness at final swage is also selected to provide sufficient, radial stiffness or hoop strength to resist significant radial spring back from the grooves 26 both during initial swage and also under subsequent tensile loading. Also, the volume of the collar 14 and swage cavity 36 are selected to provide movement of the material of collar 14 into the grooves 26 to assure a good fill. With the above dimensions and an anvil throat portion to provide approximately 16% overfill, satisfactory results were obtained. In this regard an overfill significantly under 16% would not provide the desired high preloads while an overfill significantly over 16% could result in excessive installation loads which could yield the pin 12. For a pin 12 and collar 14 of the ferrous materials having the relative shear strengths previously noted, the following dimensional relationships, in inches, were found satisfactory:

|  | Pin Crest Diameter | Depth of Grooves | Collar O.D. Before Swage | Collar I.D. Before Swage | Anvil Throat Diameter | Pin Mean Lock Groove Diameter |
|---|---|---|---|---|---|---|
| NOM DIA. | Du | h | Dc | ID | Da | Dm |
| ¼ | .500 | .0155 | .810 | .522 | .753 | .486 |
| ⅜ | .625 | .0200 | 1.009 | .648 | .939 | .605 |
| ½ | .750 | .0245 | 1.213 | .783 | 1.125 | .725 |

It is also desirable, that the width of the pin grooves 26 and pin shoulders 60 and the complementary grooves and shoulders of the swaged collar 14 be proportioned in width relative to the respective shear strengths of the materials of pin 12 and collar 14 such that both the shoulders defined by pin grooves 26 of the pin 12 and the shoulders defined by interlocking grooves of the swaged collar 14 are in incipient or simultaneous failure in shear at or above the preselected minimum ultimate design tensile load on workpieces 18 and 20. It is preferred that the design provide for the shoulders defined by the grooves of collar 14 to fail prior to the shoulders defined by pin lockgrooves 26, i.e. the shoulders of pin 12 would fail in shear at approximately 110% of the tensile load at which the shoulders of collar 14 would fail. By proportioning the grooves as noted, the engaged length of pin and collar can be minimized for a given tensile load.

One of the significant benefits of the construction of grooves 26 is the significant reduction in stress concentration factor. This benefit is realized through the combined effect of a shallow groove depth and increased groove width to provide proportioned shear strength between pin 12 and collar 14. The application of proportioned strength permits the pin grooves 26 to be elongated relative to the shoulders 26 whereby the use of an approximated, streamlined root shape can be more effectively employed. At the same time the shallow groove structure permits smooth transitions between the root 62 and the connecting sidewalls 64 and 66. While the elliptical contour employed will closely approximate the desired streamlined shape other similar continuous curves could be utilized.

With the fastener 10 constructed as described, for ferrous materials, the retained preload on the workpieces 18 and 20 after installation will be preferably between around 85% to around 95% of the applied installation load and the applied installation load, as noted, will be approximately at the yield point of pin 12. The installation load is the maximum load applied to the fastener in setting the fastener through pin break at breakneck groove 40. Note that for ferrous materials, the yield point of pin 12 will be approximately or at least around 80% of the minimum design ultimate load or strength of the fastened joint.

Thus with the fastener 10 of the present invention, a desirable high level of retained preload can be secured on the fastened joint. These levels of preload cannot be readily achieved by threaded fasteners since there the threaded pin or bolt is subjected to both torsional and tensile loads in installation. The resultant combined stresses limit the magnitude of tensile clamp load capable of being applied.

In addition to the above, the pin 12 may provide the higher clamp or preload with substantially no increase in retained stress over the threaded counterpart. There will also be a significant reduction in stress concentration with the simulated streamlined groove 62 relative to the threaded counterpart. All of the above should provide improved stress corrosion characteristics for the fastener 10 relative to the threaded counterpart.

Figure 6:
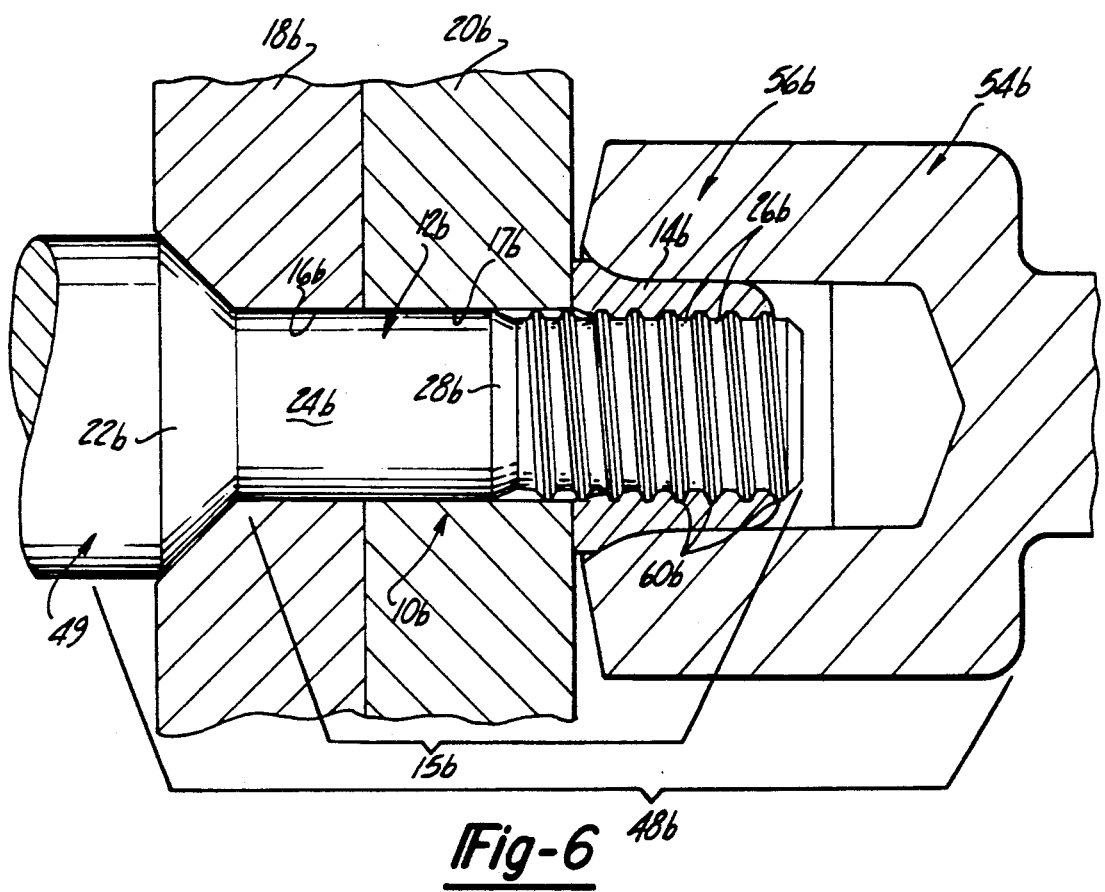
FIG. 6 is a sectional view of a fastener similar to that of FIGS. 1-3 in which the lock grooves are helical and the fastener is a stump type instead of a pull type.

The embodiments of FIGS. 1-3 show pull type fasteners; the features of the present invention, however, are also applicable to a stump type fastener as shown in FIG. 6. In the description of the embodiment of FIG. 6, components similar to like components in the embodiments of FIGS. 1-3 have been given the same number designation with the addition of the letter subscript "b".

Looking now to FIG. 6 a fastener 10b is shown to include a pin member 12b and tubular collar 14b. Pin member 12b has an elongated shank 15b which extends through aligned openings 16b and 17b in a pair of workpieces 18b and 20b, respectively, to be secured together. An enlarged flush head 22b at one end of shank 15b engages one side of workpiece 18b. Adjacent the head 22b, the shank 15b has a straight portion 24b which is adapted to be received within bores 16b and 17b with a slight clearance. Following the straight portion 24b is a plurality of circumferentially extending, helical locking grooves 26. A transition portion 28b smoothly connects the locking grooves 26b with straight shank portion 24b. Note that while the locking grooves 26 of FIGS.

1-3 are generally annular in shape the locking grooves of FIG. 6 are helical and provide certain advantages to be discussed.

The fastener 10b is adapted to be set by a tool assembly 48b which can generally be constructed in a manner known to those skilled in the art and hence has been only partially shown for purposes of simplicity. Briefly, the tool 48b included an anvil housing 54b which terminates at one end in a swage anvil portion 56b and a bucking member 49.

The symmetrically shaped, tubular collar 14b is adapted to be located over the shank 15b and, with the workpieces 18b, 20b moved together, will be in radial alignment with some of the locking grooves 26b. With actuation of the tool 48b, the swage anvil portion 56b moves against the collar 14b with the bucking member 49 resisting the axial force applied thereby; the resultant pushing force causes the workpieces 18b and 20b to be pressed together. As this relative force increases the swage anvil portion 56b will move over the collar 14b resulting in swaging of the collar 14b into the locking grooves 26b of pin 12b. Subsequently, upon further actuation of the tool 48b, the anvil portion 56b will be removed from the swaged collar 14b.

Note that in the stump version of FIG. 6, the anvil portion 56b will provide the same desired overpacking of the collar 14b into the lock grooves 26b resulting in a desirable high, retained preload on the fastened joint i.e. 85%-95% of the yield point of the pin 12b.

In the comparison between the shallow groove 26 and the conventional UNF and UNC Grade 8 threads the effective root diameter Dr for the annular groove 26 would simply be the radial distance between diametrically opposite sides of the same groove. However, the effective root diameter Dr for the Grade 8 threaded fastener would be the dimension from a root to a diametrically opposite crest. This defines a greater effective area than would be available if the threaded dimension for Dr were also from root to root. However, the shallow groove construction of groove 26 still provides for an overall increase in effective diameter over the threaded counterpart while at the same time giving the benefits of the simulated streamlined root contour. The embodiment of FIG. 6, however, employs the shallow root and at the same time is helically shaped so that the deepest point of one groove will be diametrically opposite a point which is not as deep; in this way the effective diameter Dr and hence area will be somewhat greater resulting in even further improvements in tension and fatigue over the threaded Grade 8 counterparts.

Note that conventional Grade 8 bolts require a minimum ultimate tensile strength of 150 KSI and a minimum ultimate yield strength of 130 KSI.

Thus, the construction of the present invention will provide a fastener having improved tensile and fatigue characteristics relative to its threaded counterpart. At the same time, this construction will provide a very high level of retained preload in the fastened joint. While a symmetrical tubular collar is shown a flanged base collar could be used as well; similarly, a flanged head could be used on the pin 12.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a fastening system including a fastener, for securing a plurality of workpieces together with the fastening system providing a desired magnitude of retained preload on the workpieces relative to the yield strength of the fastener with the resultant fastened joint having a minimum ultimate design tensile load of a preselected magnitude, said fastener comprising:

a pin member having an elongated shank located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, said pin grooves having a simulated streamlined root contour being generally defined by a portion of an ellipse, said ellipse portion being no greater than one half and no less than around 40% of the ellipse along the minor axis, a tubular collar swaged into said pin grooves whereby the workpieces are fastened together to define the fastened joint, said swaged collar having collar grooves and shoulders interlocking said pin grooves and shoulders, said pin member and said collar being of different materials having ultimate shear strengths of different magnitudes with the ratio of such shear strengths of said pin member to said collar being such that crushing of said pin member in swage is substantially avoided, said ratio of ultimate shear strengths of said pin member to said collar being in a range of around 1.8:1 to around 2.4:1, the axial widths of said pin grooves and shoulders and said collar grooves and shoulders being preselected in accordance with the relative shear strengths of said different materials whereby said pin shoulders and said collar shoulders are adapted to fail in shear generally at the same tensile load applied between said pin member and said collar, said collar being swaged into said pin grooves via a swage anvil having an effective throat swage portion, said collar having a predetermined volume of material which is generally at least around 16% greater than the available volume defined by said effective throat swage portion and the confronting portion of said pin grooves into which said collar is swaged, said collar being swaged to said pin member to provide a retained preload on said workpieces which results in a magnitude of stress no less than around 85% to around 95% of the yield strength of said pin member across said pin grooves, said yield strength of said pin member having a magnitude at least equal to the magnitude of stress on said pin member resulting from a tensile load on the fastened joint which is around 80% of the minimum ultimate design tensile load of the fastened joint, said pin member having sufficient strength to provide said magnitude of preload substantially without yielding in tension from the installation loads or necking from compressive swage loads, said collar having a final wall thickness provided to resist radial movement of said collar shoulders out from said pin grooves in response to the application of said minimum ultimate design tensile load on the fastened joint, said minimum ultimate design tensile load being the minimum magnitude of tensile load at which said fastener will fail, said collar being of sufficient length to provide a predetermined number of said collar shoulders engaged with a corresponding number of said pin shoulders to have a combined ultimate shear strength whereby said collar and/or said pin member will fail in shear across said pin or collar shoulders or said pin member will fail in tension diametrically across said pin grooves in response to tensile loads at or greater than said minimum ultimate design tensile load.

2. The fastening system of claim 1 with said pin member being made of a ferrous material having an ultimate shear strength of at least around 95 KSI.

3. The fastening system of claim 2 with said pin member material having a minimum ultimate tensile strength of 150 KSI.

4. The fastening system of claim 1 with said pin member being made of a ferrous material having an ultimate shear strength of at least around 95 KSI and with said collar having an ultimate shear strength of at least around 45 KSI.

5. The fastening system of claim 4 with said pin member material having a minimum ultimate tensile strength of 150 KSI.

6. In a fastening system including a fastener, for securing a plurality of workpieces together with the fastening system providing a desired magnitude of retained preload on the workpieces relative to the yield strength of the fastener with the resultant fastened joint having a minimum ultimate design tensile load of a preselected magnitude, said fastener comprising:

a pin member having an elongated shank located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, said pin grooves having a simulated streamlined root contour, a tubular collar swaged into said pin grooves whereby the workpieces are fastened together to define the fastened joint, said swaged collar having collar grooves and shoulders interlocking said pin grooves and shoulders, said pin member and said collar being of different materials having ultimate shear strengths of different magnitudes with the ratio of such shear strengths of said pin member to said collar being such that crushing of said pin member in swage is substantially avoided, said ratio of ultimate shear strengths of said pin member to said collar being in a range of around 1.8:1 to around 2.4:1, the axial widths of said pin grooves and shoulders and said collar grooves and shoulders being preselected in accordance with the relative shear strengths of said different materials whereby said pin shoulders and said collar shoulders are adapted to fail in shear generally at the same tensile load applied between said pin member and said collar, said collar being swaged into said pin grooves via a swage anvil having an effective throat swage portion, said collar having a predetermined volume of material which is generally at least around 16% greater than the available volume defined by said effective throat swage portion and the confronting portion of said pin grooves into which said collar is swaged, said collar being swaged to said pin member to provide a retained preload on said workpieces which results in a magnitude of stress no less than around 85% to around 95% of the yield strength of said pin member across said pin grooves, said yield strength of said pin member having a magnitude at least equal to the magnitude of stress on said pin member resulting from a tensile load on the fastened joint which is around 80% of the minimum ultimate design tensile load of the fastened joint, said pin member having sufficient strength to provide said magnitude of preload substantially without yielding in tension from the installation loads or necking from compressive swage loads, said collar having a final wall thickness provided to resist radial movement of said collar shoulders out from said pin grooves in response to the application of said minimum ultimate design tensile load on the fastened joint, said minimum ultimate design tensile load being the minimum magnitude of tensile load at which said fastener will fail, said collar being of sufficient length to provide a predetermined number of said collar shoulders engaged with a corresponding number of said pin shoulders to have a combined ultimate shear strength whereby said collar and/or said pin member will fail in shear across said pin or collar shoulders or said pin member will fail in tension diametrically across said pin grooves in response to tensile loads at or greater than said minimum ultimate design tensile load.

7. In a fastening system including a fastener, for securing a plurality of workpieces together with the fastening system providing a desired magnitude of retained preload on the workpieces relative to the yield strength of the fastener with the resultant fastened joint having a minimum ultimate design tensile load of a preselected magnitude, said fastener comprising:

a pin member having an elongated shank located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, a tubular collar swaged into said pin grooves whereby the workpieces are fastened together to define the fastened joint, said swaged collar having collar grooves and shoulders interlocking said pin grooves and shoulders, said pin member and said collar being of different materials having ultimate shear strengths of different magnitudes with the ratio of such shear strengths of said pin member to said collar being such that crushing of said pin member in swage is substantially avoided, said ratio of ultimate shear strengths of said pin member to said collar being in a range of around 1.8:1 to around 2.4:1, the axial widths of said pin grooves and shoulders and said collar grooves and shoulders being preselected in accordance with the relative shear strengths of said different materials whereby said pin shoulders and said collar shoulders are adpated to fail in shear generally at the same tensile load applied between said pin member and said collar, said collar being swaged into said pin grooves via a swage anvil having an effective throat swage portion, said collar having a predetermined volume of material which is generally at least around 16% greater than the available volume defined by said effective throat swage portion and the confronting portion of said pin grooves into which said collar is swaged, said collar being swaged to said pin member to provide a retained preload on said workpieces which results in a magnitude of stress no less than around 85% to around 95% of the yield strength of said pin member across said pin grooves, said yield strength of said pin member having a magnitude equal to the magnitude of stress on said pin member resulting from a tensile load on the fastened joint which is around 80% of the minimum ultimate design tensile load of the fastened joint, said pin member having sufficient strength to provide said magnitude of preload substantially without yielding in tension from the installation loads or necking from compressive swage loads, said collar having a final wall thickness provided to resist radial movement of said collar shoulders out from said pin grooves in response to the application of said minimum ultimate design tensile load on the fastened joint, said minimum ultimate design tensile load being the minimum magnitude of tensile load at which said fastener member will fail, said collar being of sufficient length to provide a predetermined number of said collar shoulders engaged with a corresponding number of said pin shoulders to have a combined ultimate shear strength whereby said collar and/or said pin will fail in shear across said pin or collar shoulders or said pin member will fail in tension diametrically across said pin grooves in response to tensile loads at or greater than said minimum ultimate design tensile load.

8. In a fastening system including a fastener, for securing a plurality of workpieces together with the fastening system providing a desired magnitude of retained preload on the workpieces relative to the yield strength of the fastener with the resultant fastened joint having a minimum ultimate design tensile load of a preselected magnitude, said fastener comprising:

a pin member having an elongated shank located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, a tubular collar swaged into said pin grooves whereby the workpieces are fastened together to define the fastened joint, said swaged collar having collar grooves and shoulders interlocking said pin grooves and shoulders, said pin member and said collar being of different materials having ultimate shear strengths of different magnitudes with the ratio of such shear strengths of said pin member to said collar being such that crushing of said pin member in swage is substantially avoided, said ratio of ultimate shear strengths of said pin member to said collar being in a range of around 1.8:1 to around 2.4:1, the axial widths of said pin grooves and shoulders and said collar grooves and shoulders being preselected in accordance with the relative shear strengths of said different materials whereby said pin shoulders and said collar shoulders are adapted to fail in shear generally at the same tensile load applied between said pin member and said collar, said collar being swaged into said pin grooves via a swage anvil having an effective throat swage portion, said collar having a predetermined volume of material which is generally at least around 16% greater than the available volume defined by said effective throat swage portion and the confronting portion of said pin grooves into which said collar is swaged, said collar being swaged to said pin member to provide a predetermined magnitude of retained preload on said workpieces, said pin member having sufficient strength to provide said magnitude of preload substantially without yielding in tension from the installation loads or necking from compressive swage loads, said collar having a final wall thickness provided to resist radial movement of said collar shoulders out from said pin grooves in response to the application of said minimum ultimate design tensile load on the fastened joint, said minimum ultimate design tensile load being the minimum magnitude of tensile load at which said fastener will fail, said collar being of sufficient length to provide a predetermined number of said collar shoulders engaged with a corresponding number of said pin shoulders to have a combined ultimate shear strength whereby said collar and/or said pin member will fail in shear across said pin or collar shoulders or said pin member will fail in tension diametrically across said pin grooves in response to tensile loads at or greater than said minimum ultimate design tensile load.

9. In a fastening system including a fastener, for securing a plurality of workpieces together with the fastening system providing a desired magnitude of retained preload on the workpieces relative to the yield strength of the fastener with the resultant fastened joint having a minimum ultimate design tensile load of a preselected magnitude, said fastener comprising:

a pin member having an elongated shank located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, said pin grooves having a simulated streamlined root contour being generally defined by a continuous curve, a tubular collar swaged into said pin grooves whereby the workpieces are fastened together to define the fastened joint, said swaged collar having collar grooves and shoulders interlocking said pin grooves and shoulders, said pin member and said collar being of different materials having ultimate shear strengths of different magnitudes with the ratio of such shear strengths of said pin member to said collar being such that crushing of said pin member in swage is substantially avoided, the axial widths of said pin grooves and shoulders and said collar grooves and shoulders being preselected in accordance with the relative shear strengths of said different materials whereby said pin shoulders and said collar shoulders are adapted to fail in shear generally at the same tensile load applied between said pin member and said collar, said collar being swaged to said pin member to provide a predetermined magnitude of retained preload on said workpieces, said pin member having sufficient strength to provide said magnitude of preload substantially without yielding in tension from the installation loads or necking from compressive swage loads, said collar having a final wall thickness provided to resist radial movement of said collar shoulders out from said pin grooves in response to the application of said minimum ultimate design tensile load on the fastened joint, said minimum ultimate design tensile load being the minimum magnitude of tensile load at which said fastener will fail, said collar being of sufficient length to provide a predetermined number of said collar shoulders engaged with a corresponding number of said pin shoulders to have a combined ultimate shear strength whereby said collar and/or said pin member will fail in shear across said pin or collar shoulders or said pin member will fail in tension diametrically across said lock grooves in response to tensile loads at or greater than said minimum ultimate design tensile load.

10. In a fastening system including a fastener, for securing a plurality of workpieces together with the fastening system providing a desired magnitude of retained preload on the workpieces relative to the yield strength of the fastener with the resultant fastened joint having a minimum ultimate design tensile load of a preselected magnitude, said fastener comprising:

a pin member made of a ferrous material and having an elongated shank located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, said pin grooves having a simulated streamlined root contour being generally defined by a portion of an ellipse, said ellipse portion being no greater than one half and no less than around 40% of the ellipse along the minor axis, a tubular collar being made of a ferrous material and swaged into said pin grooves whereby the workpieces are fastened together to define the fastened joint, said swaged collar having collar grooves and shoulders interlocking said pin grooves and shoulders, said pin member and said collar being of different materials having ultimate shear strengths of different magnitudes with the ratio of such shear strengths of said pin member to said collar being such that crushing of said pin member in swage is substantially avoided, said ratio of ultimate shear strengths of said pin member to said collar being in a range of around 1.8:1 to around 2.4:1, the axial widths of said pin grooves and shoulders and said collar grooves and shoulders being preselected in accordance with the relative shear strengths of said different materials whereby said pin shoulders and said collar shoulders are adapted to fail in shear generally at the same tensile load applied between said pin member and said collar, said collar being swaged into said pin grooves via a swage anvil having an effective throat swage portion, said collar having a predetermined volume of material which is generally at least around 16% greater than the available volume defined by said effective throat swage portion and the confronting portion of said pin grooves into which said collar is swaged, said collar being swaged to said pin member to provide a retained preload on said workpieces which results in a magnitude of stress no less than around 85% to around 95% of the yield strength of said pin member across said pin grooves, said yield strength of said pin member having a magnitude at least equal to the magnitude of stress on said pin member resulting from a tensile load on the fastened joint which is around 80% of the minimum ultimate design tensile load of the fastened joint, said pin member having sufficient strength to provide said magnitude of preload substantially without yielding in tension from the installation loads or necking from compressive swage loads, said collar having a final wall thickness provided to resist radial movement of said collar shoulders out from said pin grooves in response to the application of said minimum ultimate design tensile load on the fastened joint, said minimum ultimate design tensile load being the minimum magnitude of tensile load at which said fastener will fail, said collar being of sufficient length to provide a predetermined number of said collar shoulders engaged with a corresponding number of said pin shoulders to have a combined ultimate shear strength whereby said collar and/or said pin member will fail in shear across said pin or collar shoulders or said pin member will fail in tension diametrically across said pin grooves in response to tensile loads at or greater than said minimum ultimate design tensile load, said pin member and said collar constructed in accordance with the preceding generally providing a relationship, in inches, including the following:

| NOM DIA. | Pin Crest Diameter Du | Depth of Grooves h | Collar O.D. Before Swage Dc | Collar I.D. Before Swage ID | Anvil Throat Diameter Da | Mean Pin Groove Diameter Dm |
|---|---|---|---|---|---|---|
| ⅜ | .500 | .0155 | .810 | .522 | .753 | .486 |
| ½ | .625 | .0200 | 1.009 | .648 | .939 | .605 |
| ⅝ | .750 | .0245 | 1.213 | .783 | 1.125 | .725. |

11. In a fastening system including a fastener, for securing a plurality of workpieces together with the fastening system providing a desired magnitude of retained preload on the workpieces relative to the yield strength of the fastener with the resultant fastened joint having a minimum ultimate design tensile load of a preselected magnitude, said fastener comprising:

a pin member being made of a ferrous material and having an elongated shank located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, a tubular collar being made of a ferrous material and swaged into said pin grooves whereby the workpieces are fastened together to define the fastened joint, said swaged collar having collar grooves and shoulders interlocking said pin grooves and shoulders, said pin member and said collar being of different materials having ultimate shear strengths of different magnitudes with the ratio of such shear strengths of said pin member to said collar being such that crushing of said pin member in swage is substantially avoided, said ratio of ultimate shear strengths of said pin member to said collar being in a range of around 1.8:1 to around 2.4:1, the axial widths of said pin grooves and shoulders and said collar grooves and shoulders being preselected in accordance with the relative shear strengths of said different materials whereby said pin shoulders and said collar shoulders are adapted to fail in shear generally at the same tensile load applied between said pin member and said collar, said collar being swaged into said pin grooves via a swage anvil having an effective throat swage portion, said collar having a predetermined volume of material which is generally at least around 16% greater than the available volume defined by said effective throat swage portion and the confronting portion of said pin grooves into which said collar is swaged, said collar being swaged to said pin member to provide a retained preload on said workpieces which results in a magnitude of stress no less than around 85% to around 95% of the yield strength of said pin member across said pin grooves, said yield strength of said pin member having a magnitude at least equal to the magnitude of stress on said pin member resulting from a tensile load on the fastened joint which is around 80% of the minimum ultimate design tensile load of the fastened joint, said pin member having sufficient strength to provide said magnitude of preload substantially without yielding in tension from the installation loads or necking from compressive swage loads, said collar having a final wall thickness provided to resist radial movement of said collar shoulders out from said pin grooves in response to the application of said minimum ultimate design tensile load on the fastened joint, said minimum ultimate design tensile load being the minimum magnitude of tensile load at which said fastener will fail, said collar being of sufficient length to provide a predetermined number of said collar shoulders engaged with a corresponding number of said pin shoulders to have a combined ultimate shear strength whereby said collar and/or said pin member will fail in shear across said pin or collar shoulders or said pin member will fail in tension diametrically across said pin grooves in response to tensile loads at or greater than said minimum ultimate design tensile load said pin member and said collar constructed in accordance with the preceding generally providing a relationship, in inches, including the following:

| NOM DIA. | Pin Crest Diameter Du | Depth of Grooves h | Collar O.D. Before Swage Dc | Collar I.D. Before Swage ID | Anvil Throat Diameter Da | [Pin] Mean [Lock] Pin Groove Diameter Dm |
|---|---|---|---|---|---|---|
| ⅜ | .500 | .0155 | .810 | .522 | .753 | .486 |
| ½ | .625 | .0200 | 1.009 | .648 | .939 | .605 |
| ⅝ | .750 | .0245 | 1.213 | .783 | 1.125 | .725. |

12. In a fastening system including a fastener comprising a pin member and a collar adapted to be swaged onto the pin member for securing a plurality of workpieces together with the fastening system providing a desired magnitude of retained preload on the workpieces relative to the yield strength of the fastener with the resultant fastened joint having a minimum ultimate design tensile load of a preselected magnitude, said pin member comprising:

an elongated shank adapted to be located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, said pin grooves being substantially wider than said pin shoulders, said pin grooves having a simulated streamlined root contour being generally defined by a portion of an ellipse, said ellipse portion being no greater than one half and no less than around 40% of an ellipse along the minor axis, said pin grooves adapted to have the tubular collar swaged therein to form interlocking collar grooves and shoulders whereby the workpieces are fastened together to define the fastened joint, said pin member being of a different material and having an ultimate shear strength of a different magnitude from that of the collar with the ratio of the shear strength of said pin member to the collar being such that crushing of said pin member in swage is substantially avoided, said ratio of ultimate shear strengths of said pin member to the collar being in a range of around 1.8:1 to around 2.4:1, the axial widths of said pin grooves and shoulders being preselected in accordance with the shear strength of said different materials relative to that of the collar whereby said pin shoulders and the collar shoulders formed in swage are adapted to fail in shear generally at the same tensile load applied between said pin member and the collar, said pin member providing a retained preload on said workpieces which results in a magnitude of stress no less than around 85% to around 95% of the yield strength of said pin member across said pin grooves, said yield strength of said pin member having a magnitude at least equal to the magnitude of stress on said pin member resulting from a tensile load on the fastened joint which is around 80% of the minimum ultimate design tensile load of the fastened joint, said pin member having sufficient strength to provide said magnitude of preload substantially without yielding in tension from the installation loads or necking from compressive swage loads, said minimum ultimate design tensile load being the minimum magnitude of tensile load at which said fastener will fail, the collar being of sufficient length to provide a predetermined number of the collar shoulders engaged with a corresponding number of said pin shoulders to have a combined ultimate shear strength whereby the collar and/or said pin member will fail in shear across said pin shoulders or the collar shoulders or said pin member will fail in tension diametrically across said pin grooves in response to tensile loads at or greater than said minimum ultimate design tensile load.

13. In a fastening system including a fastener comprising a pin member and a collar adapted to be swaged onto the pin member for securing a plurality of workpieces together with the fastening system providing a desired magnitude of retained preload on the workpieces relative to the yield strength of the fastener with the resultant fastened joint having a minimum ultimate design tensile load of a preselected magnitude, said pin member comprising:

an elongated shank adapted to be located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, said pin grooves being substantially wider than said pin shoulders, said pin grooves having a simulated streamlined root contour, said pin grooves adapted to have the tubular collar swaged therein to form interlocking collar grooves and shoulders whereby the workpieces are fastened together to define the fastened joint, said pin member being of a different material and having an ultimate shear strength of a different magnitude from that of the collar with the ratio of the shear strength of said pin member to the collar being such that crushing of said pin member in swage is substantially avoided, said ratio of ultimate shear strengths of said pin member to the collar being in a range of around 1.8:1 to around 2.4:1, the axial widths of said pin grooves and shoulders being preselected in accordance with the shear strength of said different material relative to that of the collar whereby said pin shoulders and the collar shoulders formed in swage are adapted to fail in shear generally at the same tensile load applied between said pin member and the collar, said pin member providing a retained preload on said workpieces which results in a magnitude of stress no less than around 85% to around 95% of the yield strength of said pin member across said pin grooves, said yield strength of said pin member having a magnitude at least equal to the magnitude of stress on said pin member resulting from a tensile load on the fastened joint which is around 80% of the minimum ultimate design tensile load of the fastened joint, said pin member having sufficient strength to provide said magnitude of preload substantially without yielding in tension from the installation loads or necking from compressive swage loads, said minimum ultimate design tensile load being the minimum magnitude of tensile load at which said fastener will fail, the collar being of sufficient length to provide a predetermined number of collar shoulders engaged with a corresponding number of said pin shoulders to have a combined ultimate shear strength whereby the collar and/or said pin member will fail in shear across said pin shoulders or the collar shoulders or said pin member will fail in tension diametrically across said pin grooves in response to tensile loads at or greater than said minimum ultimate design tensile load.

14. In a fastening system including a fastener comprising a pin member and a collar adapted to be swaged onto the pin member for securing a plurality of workpieces together with the fastening system providing a desired magnitude of retained preload on the workpieces relative to the yield strength of the fastener with the resultant fastened joint having a minimum ultimate design tensile load of a preselected magnitude, said pin member comprising:

an elongated shank adapted to be located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, said pin grooves adapted to have the tubular collar swaged therein to form interlocking collar grooves and shoulders whereby the workpieces are fastened together to define the fastened joint, said pin member being of a different material and having an ultimate shear strength of a different magnitude from that of the collar with the ratio of the shear strength of said pin member to the collar being such that crushing of said pin member in swage is substantially avoided, the axial widths of said pin grooves and shoulders being preselected in accordance with the shear strength of said different material relative to that of the collar whereby said pin shoulders and the collar shoulders formed in swage are adapted to fail in shear generally at the same tensile load applied between said pin member and the collar, said pin member providing a retained preload on said workpieces which results in a magnitude of stress no less than around 85% to around 95% of the yield strength of said pin member across said pin grooves, said yield strength of said pin member having a magnitude at least equal to the magnitude of stress on said pin member resulting from a tensile load on the fastened joint which is around 80% of the minimum ultimate design tensile load of the fastened joint, said pin member having sufficient strength to provide said magnitude of preload substantially without yielding in tension from the installation loads or necking from compressive swage loads, said minimum ultimate design tensile load being the minimum magnitude of tensile load at which said fastener will fail, the collar being of sufficient length to provide a predetermined number of collar shoulders engaged with a corresponding number of said pin shoulders to have a combined ultimate shear strength whereby the collar and/or said pin will fail in shear across said pin shoulders or collar shoulders or said pin member will fail in tension diametrically across said pin grooves in response to tensile loads at or greater than said minimum ultimate design tensile load.

15. In a fastening system including a fastener comprising a pin member and a collar adapted to be swaged onto the pin for securing a plurality of workpieces together with the fastening system providing a desired magnitude of retained preload on the workpieces relative to the yield strength of the fastener with the resultant fastened joint having a minimum ultimate design tensile load of a preselected magnitude, said pin member comprising:

an elongated shank adapted to be located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, said pin grooves adapted to have the tubular collar swaged therein to form interlocking collar grooves and shoulders whereby the workpieces are fastened together to define the fastened joint, said pin member being of a different material and having an ultimate shear strength of a different magnitude from that of the collar with the ratio of the shear strength of said pin member to the collar being such that crushing of said pin member in swage is substantially avoided, said ratio of ultimate shear strengths of said pin member to the collar being in a range of around 1.8:1 to around 2.4:1, the axial widths of said pin grooves and shoulders being preselected in accordance with the shear strength of said different material relative to that of the collar whereby said pin shoulders and the collar shoulders formed in swage are adapted to fail in shear generally at the same tensile load applied between said pin member and the collar.

16. In a fastening system including a fastener comprising a pin member and a collar adapted to be swaged onto the pin for securing a plurality of workpieces together with the fastening system providing a desired magnitude of retained preload on the workpieces relative to the yield strength of the fastener with the resultant fastened joint having a minimum ultimate design tensile load of a preselected magnitude, said pin member comprising:

an elongated shank adapted to be located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, said pin grooves being substantially wider than said pin shoulders, said pin grooves having a simulated streamlined root contour being generally defined by a continuous curve, said pin grooves adapted to have the tubular collar swaged therein to form interlocking collar grooves and shoulders whereby the workpieces are fastened together to define the fastened joint, said pin member being of a different material and having an ultimate shear strength of a different magnitude from that of the collar with the ratio of the shear strength of said pin member to the collar being such that crushing of said pin member in swage is substantially avoided, said ratio of ultimate shear strengths of said pin member to the collar being in a range of around 1.8:1 to around 2.4:1, the axial widths of said pin grooves and shoulders being preselected in accordance with the shear strength of said different material relative to that of the collar whereby said pin shoulders and the collar shoulders formed in swage are adapted to fail in shear generally at the same tensile load applied between said pin member and the collar.

17. In a fastening system including a fastener comprising a pin member and a collar adapted to be swaged onto the pin for securing a plurality of workpieces together with the fastening system providing a desired magnitude of retained preload on the workpieces relative to the yield strength of the fastener with the resultant fastened joint having a minimum ultimate design tensile load of a preselected magnitude, said pin member comprising:

an elongated shank adapted to be located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 4, said pin grooves being substantially wider than said pin shoulders, said pin grooves having a simulated streamlined root contour being generally defined by a portion of an ellipse, said ellipse portion being no greater than one half and no less than around 40% of the ellipse along the minor axis, said pin grooves adapted to have the tubular collar swaged therein to form interlocking collar grooves and shoulders whereby the workpieces are fastened together to define the fastened joint, said pin member being of a different material and having an ultimate shear strength of a different magnitude from that of the collar with the ratio of the shear strength of said pin member to the collar being such that crushing of said pin member in swage is substantially avoided, said ratio of ultimate shear stengths of said pin member to the collar being in a range of around 1.8:1 to around 2.4:1, the axial widths of said pin grooves and shoulders being preselected in accordance with the shear strength of said different material relative to that of the collar whereby said pin shoulders and the collar shoulders formed in swage are adapted to fail in shear generally at the same tensile load applied between said pin member and the collar.

18. In a fastening system including a fastener, for securing a plurality of workpieces together with the fastening system providing a desired magnitude of retained preload on the workpieces relative to the yield strength of the fastener with the resultant fastened joint having a minimum ultimate design tensile load of a preselected magnitude, said fastener comprising:

a pin member having an elongated shank located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 3.5, said pin grooves having a simulated streamlined root contour being generally defined by a portion of an ellipse, said ellipse portion being no greater than one half and no less than around 40% of the ellipse along the minor axis, a tubular collar swaged into said pin grooves whereby the workpieces are fastened together to define the fastened joint, said swaged collar having collar grooves and shoulders interlocking said pin grooves and shoulders, said pin member and said collar being of different materials having ultimate shear strengths of different magnitudes with the ratio of such shear strengths of said pin member to said collar being such that crushing of said pin member in swage is substantially avoided, said ratio of ultimate shear strengths of said pin member to said collar being in a range of around 1.8:1 to around 2.4:1, the axial widths of said pin grooves and shoulders and said collar grooves and shoulders being preselected in accordance with the relative shear strengths of said different materials whereby said pin shoulders and said collar shoulders are adapted to fail in shear generally at the same tensile load applied between said pin member and said collar, said collar being swaged into said pin grooves via a swage anvil having an effective throat swage portion, said collar having a predetermined volume of material which is generally at least around 16% greater than the available volume defined by said effective throat swage portion and the confronting portion of said pin grooves into which said collar is swaged, said collar being swaged to said pin member to provide a retained preload on said workpieces which results in a magnitude of stress no less than around 85% to around 95% of the yield strength of said pin member across said pin grooves, said yield strength of said pin member having a magnitude at least equal to the magnitude of stress on said pin member resulting from a tensile load on the fastened joint which is around 80% of the minimum ultimate design tensile load of the fastened joint, said pin member having sufficient strength to provide said magnitude of preload substantially without yielding in tension from the installation loads or necking from compressive swage loads, said collar having a final wall thickness provided to resist radial movement of said collar shoulders out from said pin grooves in response to the application of said minimum ultimate design tensile load on the fastened joint, said minimum ultimate design tensile load being the minimum magnitude of tensile load at which said fastener will fail, said collar being of sufficient length to provide a predetermined number of said collar shoulders engaged with a corresponding number of said pin shoulders to have a combined ultimate shear strength whereby said collar and/or said pin member will fail in shear across said pin or collar shoulders or said pin member will fail in tension diametrically across said pin grooves in response to tensile loads at or greater than said minimum ultimate design tensile load.

19. The fastening system of claim 18 with said result of said relationship of $(h/Du) \times 10^2$ being between around 3.1 and 3.5.

20. In a fastening system including a fastener, for securing a plurality of workpieces together with the fastening system providing a desired magnitude of retained preload on the workpieces relative to the yield strength of the fastener with the resultant fastened joint having a minimum ultimate design tensile load of a preselected magnitude, said fastener comprising:

a pin member having an elongated shank located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 3.5, a tubular collar swaged into said pin grooves whereby the workpieces are fastened together to define the fastened joint, said swaged collar having collar grooves and shoulders interlocking said pin grooves and shoulders, said pin member and said collar being of different materials having ultimate shear strengths of different magnitudes with the ratio of such shear strengths of said pin member to said collar being such that crushing of said pin member in swage is substantially avoided, said ratio of ultimate shear strengths of said pin member to said collar being in a range of around 1.8:1 to around 2.4:1, the axial widths of said pin grooves and shoulders and said collar grooves and shoulders being preselected in accordance with the relative shear strengths of said different materials whereby said pin shoulders and said collar shoulders are adapted to fail in shear generally at the same tensile load applied between said pin member and said collar, said collar being swaged into said pin grooves via a swage anvil having an effective throat swage portion, said collar having a predetermined volume of material which is generally at least around 16% greater than the available volume defined by said effective throat swage portion and the confronting portion of said pin grooves into which said collar is swaged, said collar being swaged to said pin member to provide a predetermined magnitude of retained preload on said workpieces, said pin member having sufficient strength to provide said magnitude of preload substantially without yielding in tension from the installation loads or necking from compressive swage loads, said collar having a final wall thickness provided to resist radial movement of said collar shoulders out from said pin grooves in response to the application of said minimum ultimate design tensile load on the fastened joint, said minimum ultimate design tensile load being the minimum magnitude of tensile load at which said fastener will fail, said collar being of sufficient length to provide a predetermined number of said collar shoulders engaged with a corresponding number of said pin shoulders to have a combined ultimate shear strength whereby said collar and/or said pin member will fail in shear across said pin or collar shoulders or said pin member will fail in tension diametrically across said pin grooves in response to tensile loads at or greater than said minimum ultimate design tensile load.

21. The fastening system of claim 20 with said result of said relationship of $(h/Du) \times 10^2$ being between around 3.1 and 3.5.

22. In a fastening system including a fastener, for securing a plurality of workpieces together with the fastening system providing a desired magnitude of retained preload on the workpieces relative to the yield strength of the fastener with the resultant fastened joint having a minimum ultimate design tensile load of a preselected magnitude, said fastener comprising:

a pin member having an elongated shank located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 3.5, said pin grooves having a simulated streamlined root contour being generally defined by a continuous curve, a tubular collar swaged into said pin grooves whereby the workpieces are fastened together to define the fastened joint, said swaged collar having collar grooves and shoulders interlocking said pin grooves and shoulders, said pin member and said collar being of different materials having ultimate shear strengths of different magnitudes with the ratio of such shear strengths of said pin member to said collar being such that crushing of said pin member in swage is substantially avoided, the axial widths of said pin grooves and shoulders and said collar grooves and shoulders being preselected in accordance with the relative shear strengths of said different materials whereby said pin shoulders and said collar shoulders are adapted to fail in shear generally at the same tensile load applied between said pin member and said collar, said collar being swaged to said pin member to provide a predetermined magnitude of retained preload on said workpieces, said pin member having sufficient strength to provide said magnitude of preload substantially without yielding in tension from the installation loads or necking from compressive swage loads, said collar having a final wall thickness provided to resist radial movement of said collar shoulders out from said pin grooves in response to the application of said minimum ultimate design tensile load on the fastened joint, said minimum ultimate design tensile load being the minimum magnitude of tensile load at which said fastener will fail, said collar being of sufficient length to provide a predetermined number of said collar shoulders engaged with a corresponding number of said pin shoulders to have a combined ultimate shear strength whereby said collar and/or said pin member will fail in shear across said pin or collar shoulders or said pin member will fail in tension diametrically across said lock grooves in response to tensile loads at or greater than said minimum ultimate design tensile load.

23. The fastening system of claim 22 with said result of said relationship of $(h/Du) \times 10^2$ being between around 3.1 and 3.5.

24. The fastening system of claim 22 with said pin having a central axis, said pin grooves having leading and trailing transition portions smoothly connected to opposite ends of said continuous curve of said root contour, said leading transition portion being closest to said enlarged head and being essentially straight and extending at an angle of around 40° with a plane transverse to said central axis, said trailing transition portion being farthest from said enlarged head and being generally straight and extending at an angle of around 20° with said transverse plane.

25. The fastening system of claim 22 with said result of said relationship of $(h/Du) \times 10^2$ being between around 3.1 and 3.5, said pin having a central axis, said pin grooves having leading and trailing transition portions smoothly connected to opposite ends of said continuous curve of said root contour, said leading transition portion being closest to said enlarged head and being essentially straight and extending at an angle of around 40° with a plane transverse to said central axis, said trailing transition portion being farthest from said enlarged head and being generally straight and extending at an angle of around 20° with said transverse plane.

26. In a fastening system including a fastener comprising a pin member and a collar adapted to be swaged onto the pin member for securing a plurality of workpieces together with the fastening system providing a desired magnitude of retained preload on the workpieces relative to the yield strength of the fastener with the resultant fastened joint having a minimum ultimate design tensile load of a preselected magnitude, said pin member comprising:

an elongated shank adapted to be located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 3.5, said pin grooves adapted to have the tubular collar swaged therein to form interlocking collar grooves and shoulders whereby the workpieces are fastened together to define the fastened joint, said pin member being of a different material and having an ultimate shear strength of a different magnitude from that of the collar with the ratio of the shear strength of said pin member to the collar being such that crushing of said pin member in swage is substantially avoided, the axial widths of said pin grooves and shoulders being preselected in accordance with the shear strength of said different material relative to that of the collar whereby said pin shoulders and the collar shoulders formed in swage are adapted to fail in shear generally at the same tensile load applied between said pin member and the collar, said pin member providing a retained preload on said workpieces which result in a magnitude of stress no less than around 85% to around 95% of the yield strength of said pin member across said pin grooves, said yield strength of said pin member having a magnitude at least equal to the magnitude of stress on said pin member resulting from a tensile load on the fastened joint which is around 80% of the minimum ultimate design tensile load of the fastened joint, said pin member having sufficient strength to provide said magnitude of preload substantially without yielding in tension from the installation loads or necking from compressive swage loads, said minimum ultimate design tensile load being the minimum magnitude of tensile load at which said fastener will fail, the collar being of sufficient length to provide a predetermined number of collar shoulders engaged with a corresponding number of said pin shoulders to have a combined ultimate shear strength whereby the collar and/or said pin will fail in shear across said pin shoulders or collar shoulders or said pin member will fail in tension diametrically across said pin grooves in response to tensile loads at or greater than said minimum ultimate design tensile load.

27. The fastening system of claim 26 with said result of said relationship of $(h/Du) \times 10^2$ being between around 3.1 and 3.5.

28. In a fastening system including a fastener comprising a pin member and a collar adapted to be swaged onto the pin for securing a plurality of workpieces together with the fastening system providing a desired magnitude of retained preload on the workpieces relative to the yield strength of the fastener with the resultant fastened joint having a minimum ultimate design tensile load of a preselected magnitude, said pin member comprising:

an elongated shank adapted to be located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 3.5, said pin grooves adapted to have the tubular collar swaged therein to form interlocking collar grooves and shoulders whereby the workpieces are fastened together to define the fastened joint, said pin member being of a different material and having an ultimate shear strength of a different magnitude from that of the collar with the ratio of the shear strength of said pin member to the collar being such that crushing of said pin member in swage is substantially avoided, said ratio of ultimate shear strengths of said pin member to the collar being in a range of around 1.8:1 to around 2.4:1, the axial widths of said pin grooves and shoulders being preselected in accordance with the shear strength of said different material relative to that of the collar whereby said pin shoulders and the collar shoulders formed in swage are adapted to fail in shear generally at the same tensile load applied between said pin member and the collar.

29. The fastening system of claim 28 with said result of said relationship of $(h/Du) \times 10^2$ being between around 3.1 and 3.5.

30. In a fastening system including a fastener comprising a pin member and a collar adapted to be swaged onto the pin for securing a plurality of workpieces together with the fastening system providing a desired magnitude of retained preload on the workpieces relative to the yield strength of the fastener with the resultant fastened joint having a minimum ultimate design tensile load of a preselected magnitude, said pin member comprising:

an elongated shank adapted to be located in aligned openings in the workpieces and terminating at one end in an enlarged head and at its opposite end in a grooved portion comprising a plurality of circumferentially extending pin grooves and associated pin shoulders, said pin grooves being shallow and having a radial depth defined by the relationship of: $(h/Du) \times 10^2$, where h is said radial depth and Du is the diameter as defined by said pin shoulders and with said depth h selected to be shallow relative to said shoulder diameter Du to provide a result to said relationship of no greater than around 3.5 said pin grooves being substantially wider than said pin shoulders, said pin grooves having a simulated streamlined root contour being generally defined by a continuous curve, said pin grooves adapted to have the tubular collar swaged therein to form interlocking collar grooves and shoulders whereby the workpieces are fastened together to define the fastened joint, said pin member being of a different material and having an ultimate shear strength of a different magnitude from that of the collar with the ratio of the shear strength of said pin member to the collar being such that crushing of said pin member in swage is substantially avoided, said ratio of ultimate shear strengths of said pin member to the collar being in a range of around 1.8:1 to around 2.4:1, the axial widths of said pin grooves and shoulders being preselected in accordance with the shear strength of said different material relative to that of the collar whereby said pin shoulders and the collar shoulders formed in swage are adapted to fail in shear generally at the same tensile load applied between said pin member and the collar.

31. The fastening system of claim 30 with said result of said relationship of $(h/Du) \times 10^2$ being between around 3.1 and 3.5.

32. The fastening system of claim 30 with said pin having a central axis, said pin grooves having leading and trailing transition portions smoothly connected to opposite ends of said continuous curve of said root contour, said leading transition portion being closest to said enlarged head and being essentially straight and extending at an angle of around 40° with a plane transverse to said central axis, said trailing transition portion being farthest from said enlarged head and being generally straight and extending at an angle of around 20° with said transverse plane.

33. The fastening system of claim 30 with said result of said relationship of $(h/Du) \times 10^2$ being between around 3.1 and 3.5, said pin having a central axis, said pin grooves having leading and trailing transition portions smoothly connected to opposite ends of said continuous curve of said root contour, said leading transition portion being closest to said enlarged head and being essentially straight and extending at an angle of around 40° with a plane transverse to said central axis, said trailing transition portion being farthest from said enlarged head and being generally straight and extending at an angle of around 20° with said transverse plane.

* * * * *

UNITED STATES PATENT AND TRADEMARK OFFICE
CERTIFICATE OF CORRECTION

PATENT NO. : 5,090,852

DATED : February 25, 1992

INVENTOR(S) : Richard D. Dixon

It is certified that error appears in the above-identified patent and that said Letters Patent is hereby corrected as shown below:

On the title page, Item [56]:

In the Prior Art, "German Patent No. 3022414 1/1972" should be --German Patent No. 3022414 1/1982--.

Column 20, line 26, claim 11, delete "[Pin].

Column 20, line 27, claim 11, delete [Lock].

Signed and Sealed this

Twelfth Day of October, 1993

Attest:

BRUCE LEHMAN

*Attesting Officer*     *Commissioner of Patents and Trademarks*